(12) United States Patent
Walters (10) Patent No.: US 6,862,593 B2
(45) Date of Patent: Mar. 1, 2005

(54) SEPARATION OF DATABASE TRANSACTIONS

(75) Inventor: Arthur P. Walters, Thornton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 475 days.

(21) Appl. No.: 10/150,808

(22) Filed: May 17, 2002

(65) Prior Publication Data

US 2003/0217064 A1 Nov. 20, 2003

(51) Int. Cl.$^7$ .............................................. G06F 17/30
(52) U.S. Cl. .......................................... 707/8; 707/10
(58) Field of Search .......................... 707/8, 9, 10, 100, 707/104.1; 360/69; 463/29, 40, 43; 709/214; 710/302; 711/114, 129, 173; 713/191, 201, 400; 714/4; 719/319

(56) References Cited

U.S. PATENT DOCUMENTS 6,253,130 B1 * 6/2001 Mergenthaler et al. ....... 701/34

2003/0217064 A1 * 11/2003 Walters ....................... 707/100
2004/0064729 A1 * 4/2004 Yellepeddy .................. 713/201

* cited by examiner

Primary Examiner—Diane D Mizrahi
Assistant Examiner—Apu M Mofiz
(74) Attorney, Agent, or Firm—Blakely, Sokoloff, Taylor & Zafman, LLP (57) ABSTRACT

According to an embodiment of the invention, a database is separated into at least a first partition and a second partition. An instruction comprising access to the database is received. An address is determined for the instruction, with a first address being assigned if the access involves a read of data in the database and a second address being assigned if the access involves a write of data in the database. The instruction is executed on the first partition of the database if the instruction involves a read of data and on the second partition of the database if the instruction involves a write of data.

29 Claims, 8 Drawing Sheets

Embodiments of Database
Transaction Separation

Figure 1 — Conventional Database Access

Figure 2   Embodiments of Database Transaction Separation

Figure 3 — Embodiments of Database Transaction Separation

Figure 4 — Embodiments of Database Transaction Separation in Internet Environment Figure 5 — Conventional Database Server Used for Reading and Writing

Figure 6

Single Writeable Server and Single Read-Only Server

Figure 7 — Multiple Read-Only Database Servers

Figure 8  Multiple Read-Only Database Servers and Read-Write Cluster

SEPARATION OF DATABASE TRANSACTIONS

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright© 2002, Sun Microsystems, Inc., All Rights Reserved.

FIELD OF INVENTION

An embodiment of the invention relates to computer network operations in general, and more specifically to separation of database transactions.

BACKGROUND OF INVENTION

In a network, commands may be received from multiple sources. In particular, a database, which is a central repository of a particular set of data, may be accessed for many different purposes by many different parties. The transactions involving a database will be a combination of requests to read data from the database and requests to write data to the database, with the number of read and write requests varying dependent on the operations being performed.

If numerous requests are made regarding a set of data contained in a database, the operational load on the database server may become very high. In a conventional system, transactions for a particular database are generally all handled in the same manner, thereby creating potential overload situations in time periods when many requests are made. Within a network, the loads put on certain components may be balanced to prevent overloads for any component, provide high availability of resources, and balance the use of resources. Load balancing has the added advantage of allowing switching of loads more easily if some part of the network fails. However, the nature of a database as a central repository of data makes conventional ideas of load balancing inapplicable. Further, within a conventional system, a failure in any part of a database will result in complete failure of the system and the loss of any database access.

Figure 1:
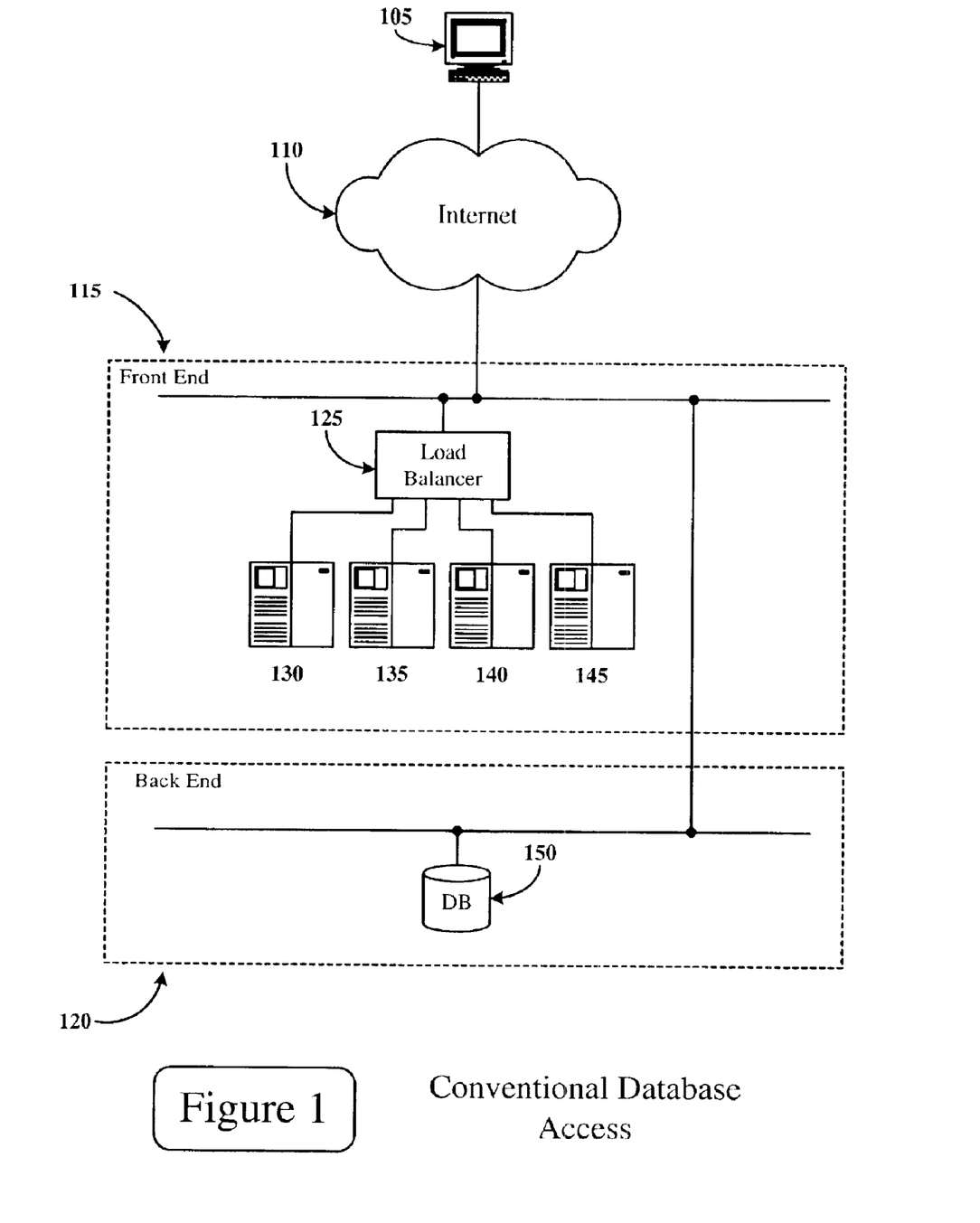
FIG. 1 is an illustration of conventional access to a database in a network.

FIG. 1 illustrates an example of conventional access to a database. In this example, a client system 105 is connected to the Internet 110. The client system 105 accesses a site that is comprised of a front end system 115 and a back end system 120. The front end system 115 includes a load balancer 125 that balances the operational load on multiple web servers, shown here as a first web server 130, a second web server 135, a third web server 140, and a fourth web server 145. A request from the client system 105 may be handled by any of the web servers depending on the load that each web server is servicing. In this example, the back end system 120 includes a database 150, which is a central repository for a particular set of data. If the request from the client system 105 includes access to the database 150, the web server that is handling the request will route the database transaction to the database 150. However, any other transaction that involves the set of data stored on database 150 will also be routed to the database. Under the conventional database access, the load on the web servers may be balanced, but database transactions for a particular set of data are all routed to the database server containing the set of data.

SUMMARY OF INVENTION

The present invention, includes novel methods and apparatus for separation of database transactions.

According to one embodiment of the invention, a method is disclosed. An instruction including database access is received. A first address is determined for the instruction if the instruction involves reading from the database and a second address is determined if the instruction involves writing to the database. The instruction is executed on a first partition of the database if the instruction involves reading data from the database and the instruction is executed on a second partition of the database if the instruction involves writing data to the database.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for separation of database transactions.

In the following description, for the purposes of explanation, numerous specific details are set forth. However, it is understood that embodiments of the invention may be practiced without these specific details. In other instances, well-known circuits, structures, techniques, and devices have not been shown in detail in order not to obscure the understanding of this description.

Embodiments of the invention includes various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Terminology

Before describing an exemplary environment in which various embodiments of the present invention may be implemented, some terms that will be used throughout this application will briefly be defined:

As used herein, "database" means any collection of data that is organized for collection and retrieval.

As used herein, "virtual address" means any address that is mapped or otherwise directed to a real or physical address.

As used herein, "XML" or "extensible markup language" means a system created to define other markup languages and that is used to create methods for the exchange of data among diverse clients.

As used herein, "tag" or "tag entry" means a code within a data structure that gives instructions for formatting or for other actions.

As used herein, "SQL" or "structured query language" means a standardized query language for requesting information from a database.

As used herein, "server farm" means multiple systems providing the same functionality under the mapping of a virtual address.

As used herein, "cluster" or "cluster farm" means a group of computers or other resources that function together and that operate such as to resemble the operation of a single system.

Database transactions execute requests to read data from a database and execute requests to write data to the database. According to an embodiment of the invention, different types of database transactions are mapped to different addresses. According to an embodiment of the invention, a request to read from a database is mapped to an address for a read-only database partition and a request to write to a database is mapped to an address for a read-write database partition.

Under an embodiment of the invention, there is a separation of the manner in which database write operations and database read operations are implemented. Under a particular embodiment of the invention, a mapping file is set up that includes separate connection definitions for different types of database transactions. Under one embodiment of the invention, the file is an XML (extensible markup language) file. Under an embodiment, the mapping file is used to set up the appropriate connections to the database. Under an embodiment of the invention, there is a separation of tag entries for database transactions in the mapping file. A first tag entry in a mapping file may be set up for a database read operation and a second tag entry in the mapping file may be set up for a database write operation. Depending on the embodiment, a tag entry may provide a system name for a particular server, a virtual IP address, a cluster address, or another form of address or designation for the server.

The utilization of a mapping file may vary according to the particular embodiment of the invention. For example, an application may utilize multiple databases, thereby potentially creating multiple read/write tag pairs. One mapping file may be being used in conjunction with each of the databases; or a single mapping file may be used for all of the databases; or the databases may be otherwise mapped as appropriate for a particular embodiment of the invention.

In one embodiment of the invention, a first tag is set up for a virtual IP address for writing to a read-write database server. A second tag is set up for a virtual IP address for reading from one or more read-only database servers. Under the embodiment, if there is a request for information, an application can obtain the information from a read-only copy of the database. If there is modification of information, the information is modified on the read-write copy of the database.

In a particular example, a request for a user's preferences may be obtained from information stored on a read-only version of a database, while an update to the user's preferences is made on the read-write copy of the database. Following an update or other modification of the database, the one or more read-only copies are updated with the modification.

Under an embodiment of the invention, there is separation of two different tags to distinguish how a database is accessed, thereby making the database more available for both read and write operations. In a conventional system, if there is a single tag that provides connection information for a single database system and the system fails, all portions of the database fail. Under an embodiment of the invention, if the write portion of a database in not operational, the read portion of the database may still be available and may be accessed using the tag for database read operations.

Figure 2:
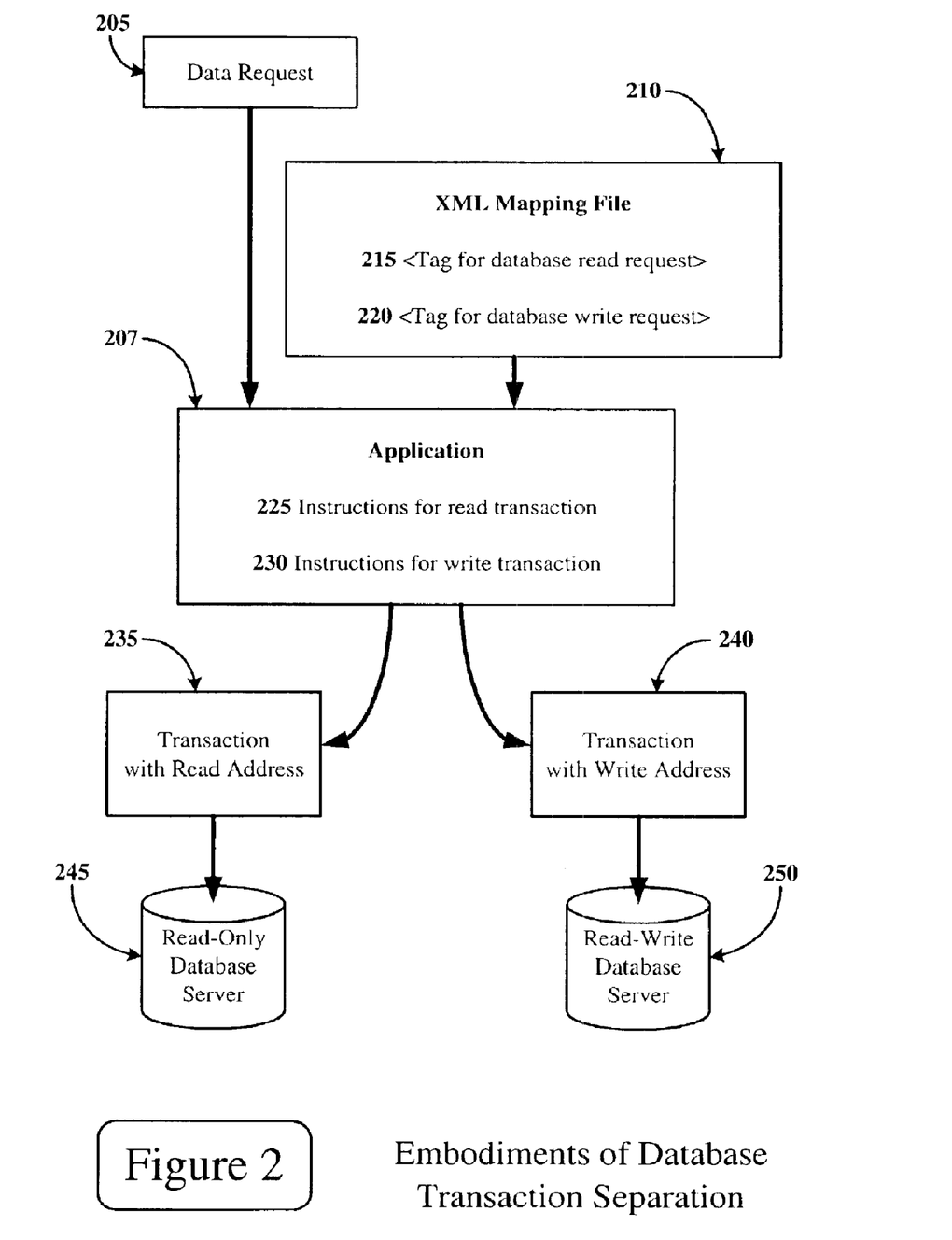
FIG. 2 is an illustration of mapping database transactions under embodiments of the invention.

FIG. 2 is an illustration of the separation of database transactions under an embodiment of the invention. In this embodiment, a database request 205 in conjunction with a mapping file 210 is transferred into an application 207. Under a particular embodiment, mapping file 210 is an XML mapping file, but a mapping file is not limited to any particular format. Within the mapping file 210 there are tags that include a first tag 215 for a database read request and a second tag 220 for a database write request. The application 207 records mapping file routing information to be used as parameters for instructions for a read transaction 225 and instructions for a write transaction 230. In FIG. 2, the instructions for a read transaction 225 utilize address information for routing read transactions, which may be a virtual IP address for one or more read-only database servers. The instructions for a write transaction 230 utilize address information for routing write transactions, which may be a virtual IP address for one or more read-write database servers.

According to the embodiment illustrated in FIG. 2, the database includes a read-only database server 245 and a read-write database server 250. A request to read data from the database is directed to the read-only database server 245, which performs only read operations for the database. A request to write data to the database is directed to the read-write database server 250, which may perform write operations for the database. After data is written to the read-write database server 250, the data changes are copied to the read-only database server 245. If the data request 205 directs that data be read from the database, a first transaction 235 may be addressed to the assigned read address and be routed to the read-only database 245. If the data request 205 directs that data be written to the database, a second transaction 240 may be addressed to the assigned write address and be routed to the read-write database 250.

In a network environment, load balancers may distribute incoming requests from a network, such as the Internet, into multiple systems. Load balancing in conventional systems is generally implemented in front end systems, which are web servers facing the Internet. A load balancer may take a request, find the most available system, and forward the request to that system. Under an embodiment of the invention, load balancing is utilized for a database. Under an embodiment of the invention, load balancing is implemented for a database that is contained in a back end system. Under an embodiment of the invention, a database is transformed into multiple systems comprising a read-write database partition, in which data may be written as well as read, and one or more read-only database partitions. Under the embodiment, the read-only database partitions provide access to copies of the database that are updated as data is modified on the read-write database. Under an embodiment of the invention, the read-only database partition and the read-write database partition may overlap, depending on the components comprising the database. Under an embodiment of the invention, load balancing is implemented between the database components.

Under an embodiment of the invention, a load balancer listens for particular IP addresses that have been set up for a network site. In the case of the Internet, the site is named in the Internet under the DNS (domain name service) for the Internet domain. For example, the URL (uniform resource locator) for a website is input and is converted into an IP address, which is a virtual IP address from the load balancer. Each server has its own IP address, but also may reside in one or more server farms. The server listens for network traffic coming from the load balancer to specific virtual IP addresses. When the load balancer sends the virtual IP address to a server, the server responds to the address based upon load balancing requirements.

Under an embodiment of the invention, a database may be accessed for purposes of obtaining required information, such as information regarding a particular user's preferences. The request may be transferred from a web server through any intervening firewall to a back end network. In a particular embodiment of the invention, a database is comprised of a load balancer, a read-write server, and one or more read-only servers. In this example, the client application running on the web server utilizes a mapping file to obtain an address for the database. The mapping file will have two entries for two different connections for database transactions, designated by a read-only connection tag and a read/write connection tag.

In a particular example under an embodiment of the invention, a web server that is looking up preferences for a user in a database will be directed by the read transaction tag to a virtual IP address to access a server farm comprising one or more read-only databases. The web server will access the information from a read-only database and the information will be presented back to the web server. If a user makes a change in a preference, the system will write the information to the database. In this case, the database entry will be created using the connection information associated with the write transaction tag, which provides a virtual IP address for a server that has read-write capability.

Under a particular embodiment of the invention, interaction with a particular database is accomplished through a driver that allows translation of standard database commands into commands for the database. The driver translating the commands may be JDBC (Java Database Connectivity), a Java API (application program interface) that enables a Java programs to execute structured query language (SQL) statements. According the embodiment of the invention, JDBC is used to set up separate database connections based on the tag entries for database read transactions and write transactions. In the embodiment, the use of JDBC allows a Java program to interact with any SQL compliant database. Structured query language is a standardized query language for requesting information from a database. Under another embodiment, access to the database may be utilized using ODBC (Open Database Connectivity) access or by access through JDBC to ODBC to the database. The specific applications, languages, and data structures discussed herein are meant as examples and are not required for embodiments of the invention.

Figure 3:
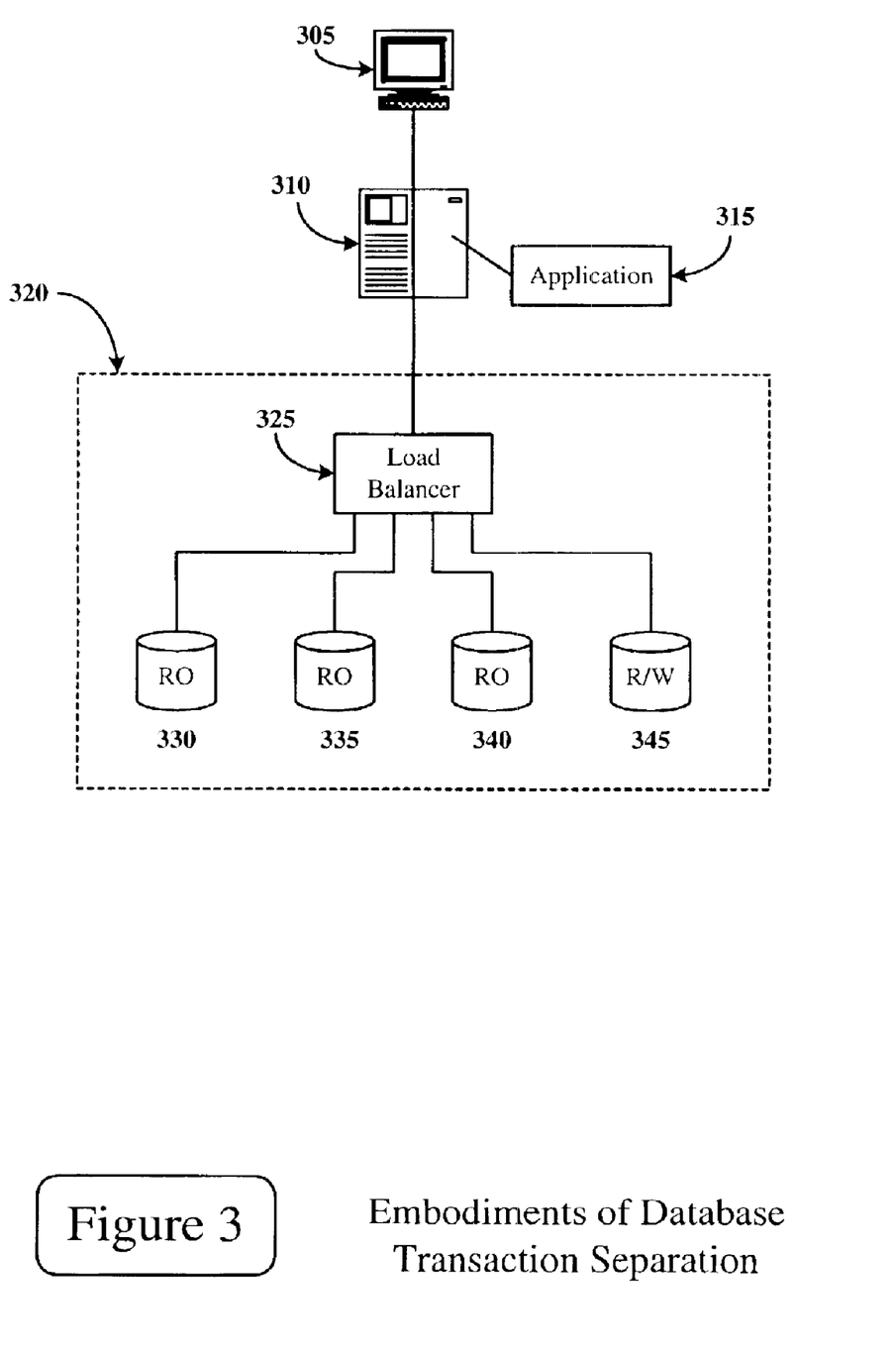
FIG. 3 is an illustration of a system under embodiments of the invention.

FIG. 3 is an illustration of the separation of database transactions under an embodiment of the invention. FIG. 3 is a simplified illustration, and embodiments may include other connections and other devices. According to the embodiment, a client system 305 is connected to a server 310. The server includes an application 315. The functions of application 315 include mapping database transactions. Mapping of database transactions may include mapping database read transactions to a first address and mapping database write transactions to a second address.

In FIG. 3, a database 320 is comprised of a load balancer 325, multiple read-only servers, shown as a first read-only server 330, a second read-only server 335, and a third read-only server 340, and a read-write server 345. The read-only servers each contain a copy of the database and are accessed for read operations. The read-write server 345 contains a copy of the database is accessed for write and read operations. After data is written to read-write server 345, the changes are copied to read-only servers 330, 335, and 340 to update the database copies on such servers. The database servers are accessed through the load balancer 325. Load balancer 325 routes a write operation to the write server farm comprising read-write server 345 and routes a read operation to the read server farm comprising the first read-only server 330, the second read-only server 335, the third read-only server 340, and the read-write server 345. The load balancer 325 balances the operational load between the servers.

If a database request from client server 305 in FIG. 3 is a read request for the database 320, the server 310 utilizes application 315 to map a database transaction to the address for read operations. The load balancer 325 then routes the transaction to one of the read-only servers or the read-write server 345 based upon load balancing. If a database request from client server 305 is a write request for database 320, the server 310 utilizes application 315 to map a database transaction to the address for write operations and the load balancer 325 then routes the transaction to the read-write server 345.

Figure 4:
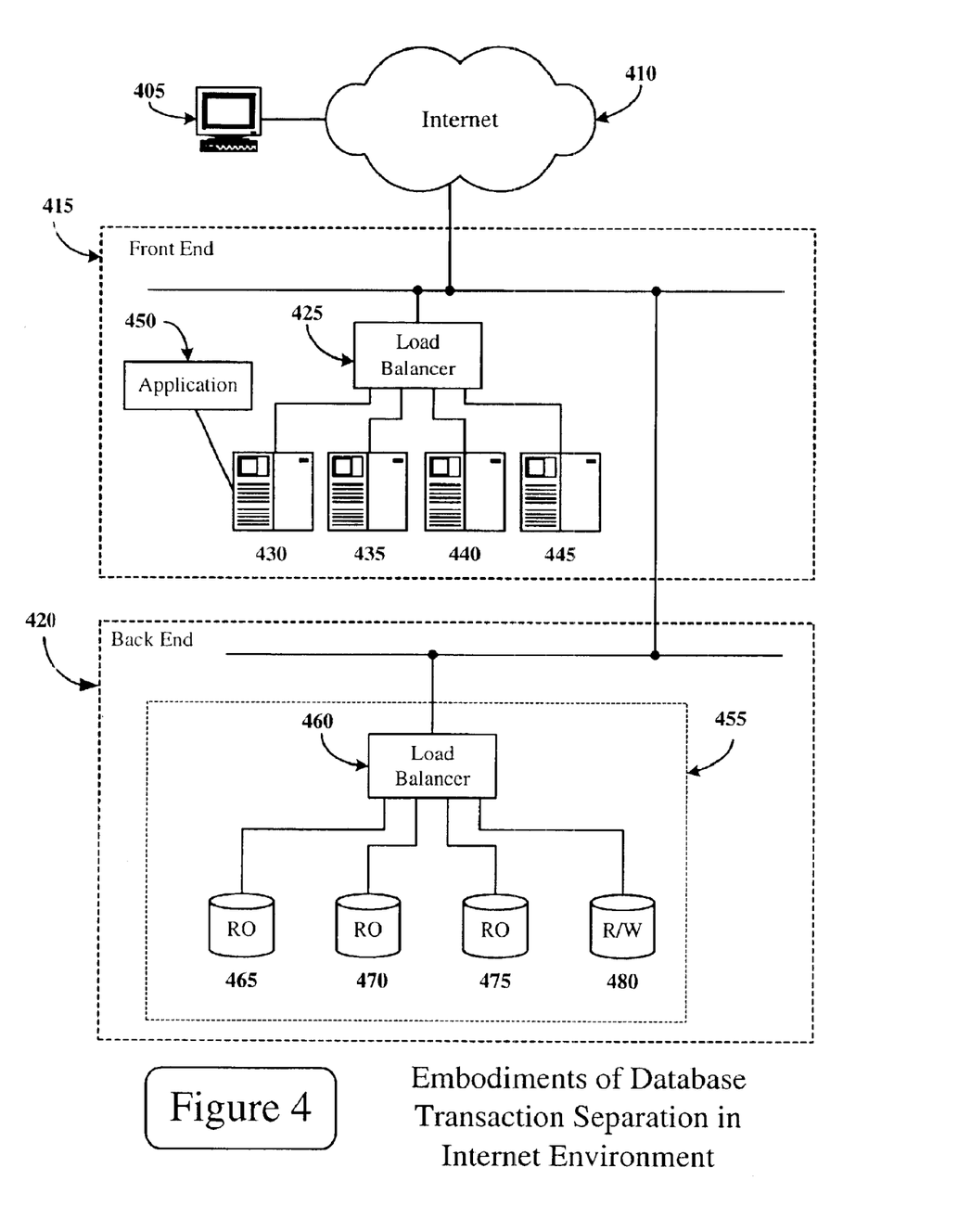
FIG. 4 is an illustration of a system in an Internet environment under embodiments of the invention.

FIG. 4 is an illustration of the separation of database transactions under an embodiment of the invention in an Internet environment. FIG. 4 is a simplified drawing of a Internet environment that does not contain all devices, applications, and connections that may be included in an embodiment of the invention. According to the embodiment, systems connected to the Internet 410 include a client system 405. Also connected to the Internet 410 is a front end system 415, which is in turn connected to a back end system 420. The front end system 415 includes multiple web servers, illustrated as a first web server 430, a second web server 435, a third web server 440, and a fourth web server 445. The web servers are connected with a first load balancer 425 that balances the operational load on the web servers.

In the embodiment shown in FIG. 4, the web servers may contain applications that map database transactions based at least in part on whether a transaction is a read request or a write request. For example, the first server 430 includes an application 450. Under an embodiment of the invention, the application 450 utilizes an XML mapping file. The functions of application 450 include mapping database transactions. Mapping of database transactions may include mapping database read transactions to a first address and mapping database write transactions to a second address. Under a particular embodiment of the invention, the first address and the second address may be virtual IP addresses.

In FIG. 4, the back end system 420 includes a database 455. The database 455 is comprised of a second load balancer 460; multiple read-only servers, shown as a first read-only server 465, a second read-only server 470, and a third read-only server 475; and a read-write server 480. The read-only servers each contain a copy of the database that may be accessed for read-only operations. The read-write server 480 contains a copy of the database that may be accessed for write and read operations. After data is written to read-write server 480, the changes are copied to read-only servers 465, 470, and 475 to update the database copies on such servers. The database servers are accessed through the second load balancer 460. The second load balancer 460 routes a write operation to the write server farm consisting of read-write server 480 and routes a read operation to the read server farm consisting of the first read-only server 465, the second read-only server 470, the third read-only server 475, and the read-write server 480. The second load balancer 460 balances the operational loads of the servers.

If a database request from client server 405 is a read request for the database 455, one of the web servers, for example first web server 430, maps a database transaction to the address for read operations. The second load balancer 460 then routes the transaction to one of the read-only servers or to the read-write server 480 based upon load balancing factors. If a database request from client server 405 is a write request for database 455, a web server maps a database transaction to the address for write operations. The second load server 460 routes the transaction to the read-write server 480.

Figure 5:
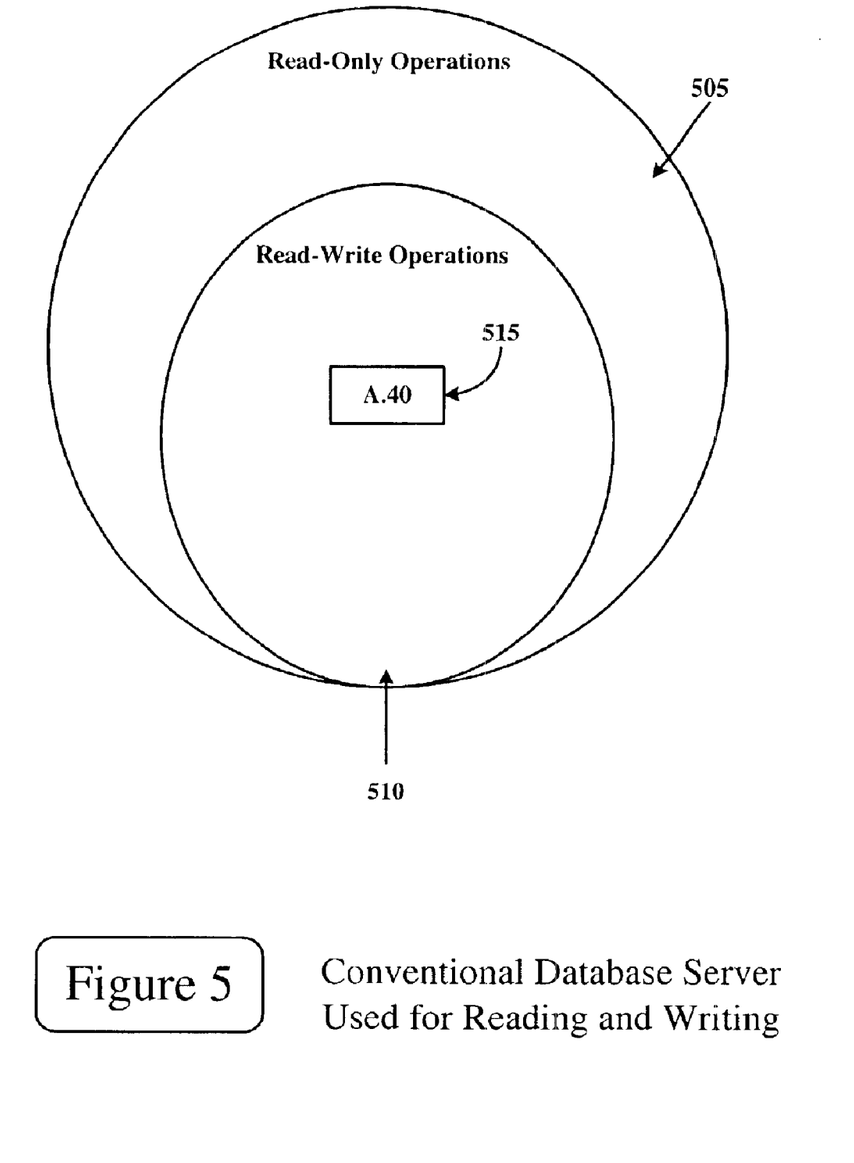
FIG. 5 is a diagram illustrating conventional database operations.

FIG. 5 is a Venn diagram illustrating the operations of a conventional database. In this illustration, a single database server is utilized for both reading and writing operations. A single server address, designed as A.40 515, operates for both read-only operations 505 and read-write operations 510. As seen, the read-write operations 510 overlap completely with the read-only operations 505, as a single server is used for both types of operations.

Figure 6:
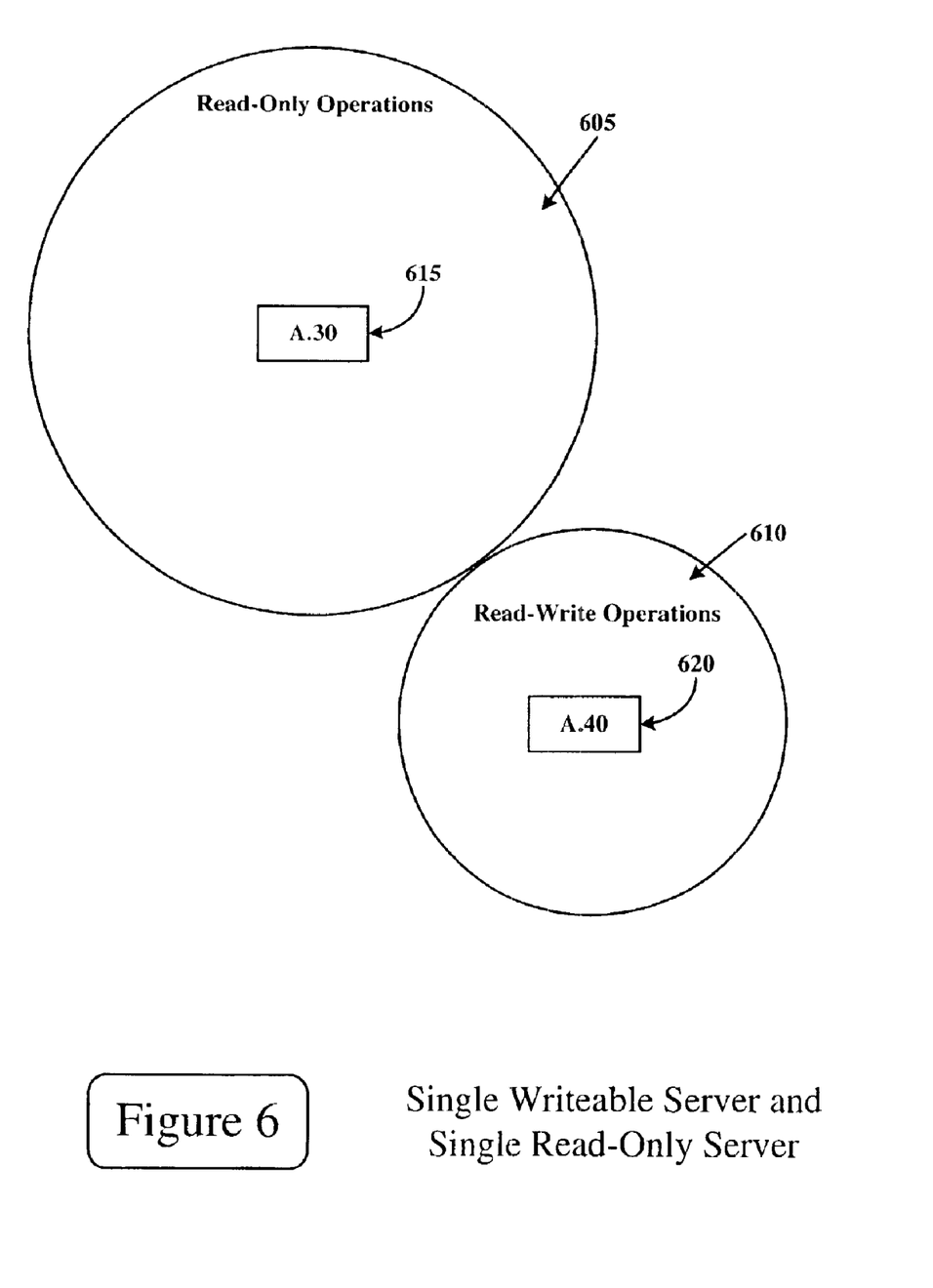
FIG. 6 is a diagram illustrating operations under an embodiment of the invention utilizing a single read-write database server and a single read-only database server.

FIG. 6 is a Venn diagram illustrating operations under an embodiment of the invention in which a single writeable database server and a single read-only database server are utilized. In this illustration, read-only operations 605 are mapped to address A.30 615 for the read-only server and read-write operations 610 are mapped to the address A.40 620 for the writeable server. As separate servers are used for the operations, there is no overlap between read-only operations 605 and read-write operations 610.

Figure 7:
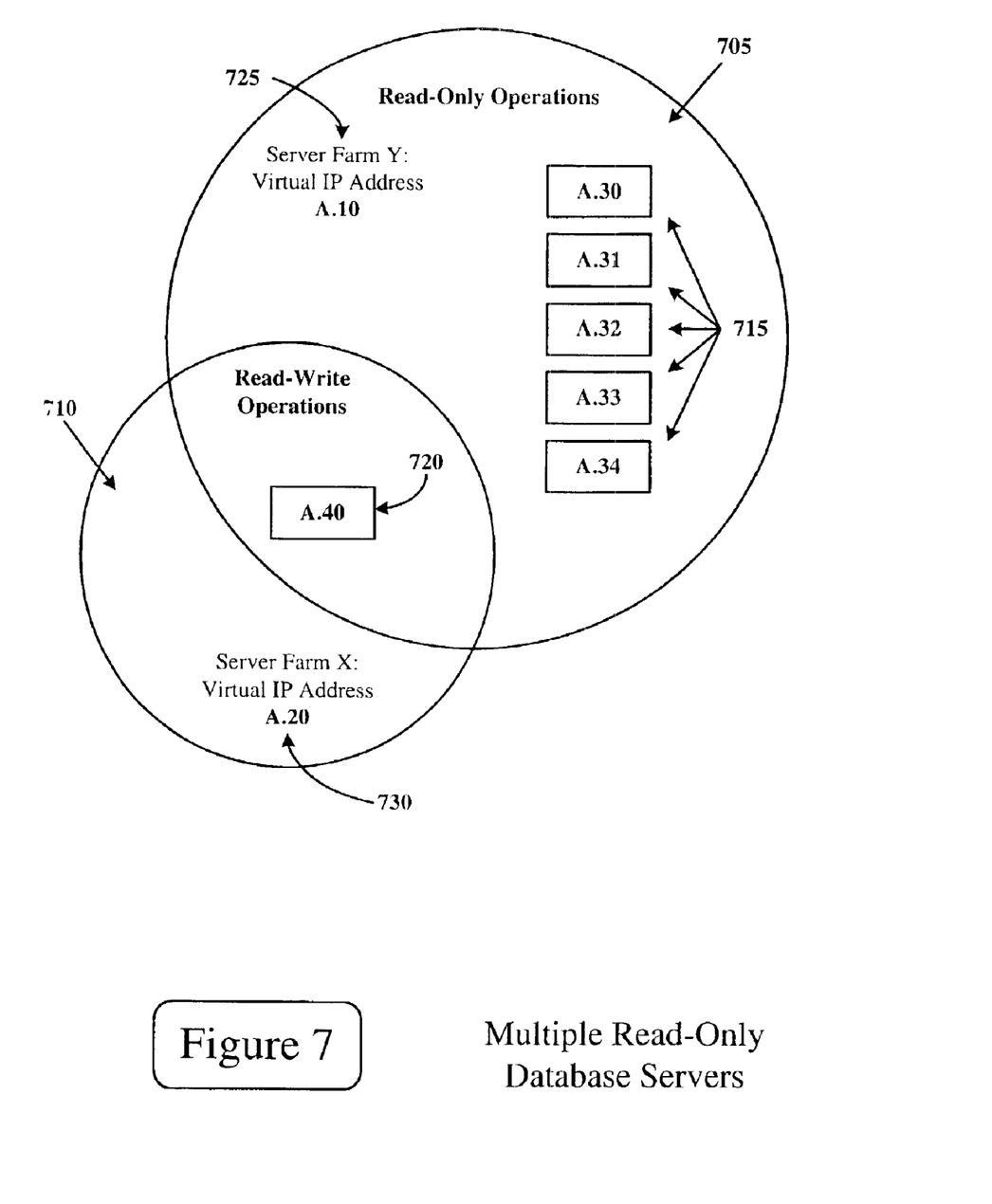
FIG. 7 is a diagram illustrating operations under an embodiment of the invention utilizing a single read-write database server and multiple read-only servers.

FIG. 7 illustrates operations under an embodiment of the invention in which a database is served by multiple read-only database servers and a single read-write server. As indicated in FIG. 7, the read-only operations 705 are served by a server farm Y, with server farm Y comprising both the read-only servers, addressed as A.30, A.31, A.32, A.33, and A.34 715, and the read-write server, addressed as A.40 720. The read-write operations 710 are served by a server farm X, with server farm X comprising the read-write server. In the illustration, server farm Y 715 is addressed for read-only operations by the virtual address A.10 725. Server farm X is addressed by the virtual address A.20 730. Because of the inclusion of the read-write server for both server farm X and server farm Y, there is an overlap between the read-only operations 705 and the read-write operations 710. For this illustration, the servers and addresses for database operations may be summarized as the following:

| Operation | Read-Write | Read-Only |
|---|---|---|
| Server Farm | Server Farm X | Server Farm Y |
| Virtual IP Address | A.20 | A.10 |
| Addresses Included | A.40 | A.30 |
| | | A.31 |
| | | A.32 |
| | | A.33 |
| | | A.34 |
| | | A.40 |

Figure 8:
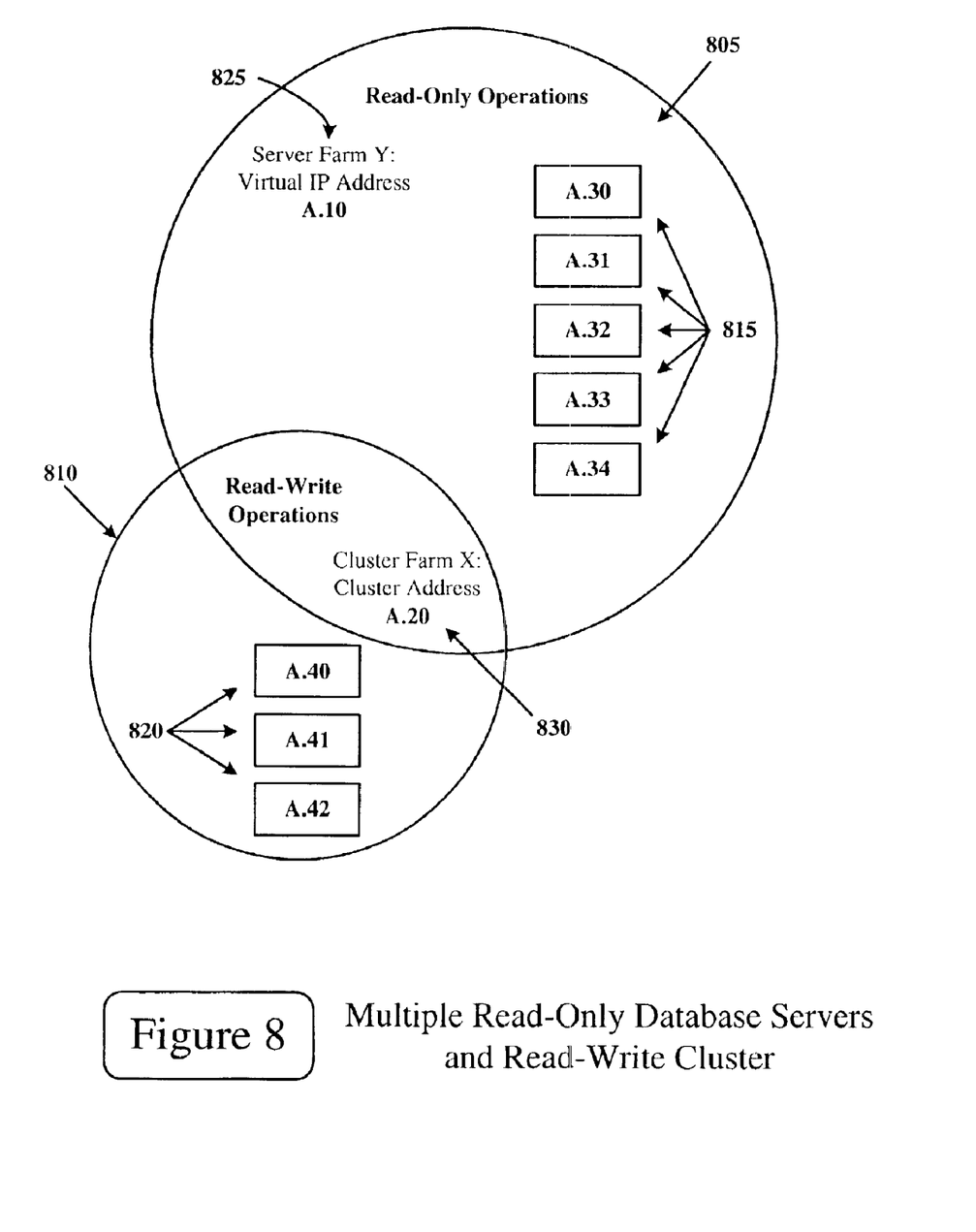
FIG. 8 is a diagram illustrating operations under an embodiment of the invention utilizing a cluster of servers for read-write operations and multiple read-only servers.

FIG. 8 illustrates operations under an embodiment of the invention in which there are multiple read-only database servers and multiple read-write servers. As indicated in FIG. 8, the read-only operations 805 are served by a server farm Y, comprising the read-only servers, addressed as A.30, A.31, A.32, A.33, and A.34 815, and the cluster address A.20 830. The read-write operations 810 are served by cluster farm X, comprising the multiple read-write servers, addressed as A.40, A.41, and A42 820. In the illustration, server farm Y is addressed for read-only operations by the virtual address A.10 825. Cluster farm X is addressed by the virtual address A.20 830. Because of the inclusion of the cluster of read-write servers for both server farm Y and cluster farm X, there is an overlap between the read-only operations 805 and the read-write operations 810. For this illustration, the servers and addresses for database operations may be summarized as the following:

| Operation | Read-Write | Read-Only |
|---|---|---|
| Server Farm or Cluster Farm | Cluster Farm X | Server Farm Y |
| Virtual IP Address or Cluster Address | A.20 | A.10 |
| Addresses Included | A.40 | A.30 |
| | A.41 | A.31 |
| | A.42 | A.32 |
| | | A.33 |
| | | A.34 |
| | | A.20 |

The invention has been described in terms of several embodiments. However, those skilled in the art will recognize that the invention is not limited to the embodiments described, but rather that modifications and changes may be made without departing from the broader spirit and scope of the invention. The specification and drawings are thus to be regarded as illustrative rather than limiting.

What is claimed is:

1. A method comprising:
   separating a database into at least a first partition and a second partition;
   receiving an instruction, the instruction including access to the database;
   determining an address for the instruction, a first address being assigned if the access involves reading data from the database and a second address being assigned if the access involves writing data to the database; and
   executing the instruction on the first partition of the database if the instruction involves reading data from the database and executing the instruction on the second partition of the database if the instruction involves writing data to the database.

2. The method of claim 1, wherein the first partition of the database comprises one or more read-only servers.

3. The method of claim 2, wherein the second partition of the database comprises one or more read-write servers.

4. The method of claim 3, further comprising updating data on the one or more read-only servers after performance of a write operation to the one or more read-write servers.

5. The method of claim 1, wherein the database comprises a load balancer, the load balancer balancing operational loads on the database.

6. The method of claim 1, wherein a mapping file maps the addresses for instructions to either the first address or the second address.

7. The method of claim 6 wherein the mapping file is an XML mapping file.

8. The method of claim 1, wherein the first address and the second address are virtual addresses.

9. A machine-readable medium having stored thereon data representing sequences of instructions that, when executed by a processor, cause the processor to perform operations comprising:
   separating a database into at least a first partition and a second partition;
   receiving an instruction, the instruction including access to the database;
   determining an address for the instruction, a first address being assigned if the access involves reading data from the database and a second address being assigned if the access involves writing data to the database; and
   executing the instruction on the first partition of the database if the instruction involves reading data from the database and executing the instruction on the second partition of the database if the instruction involves writing data to the database.

10. The medium of claim 9, wherein the first partition of the database comprises one or more read-only servers.

11. The medium of claim 10, wherein the second partition of the database comprises one or more read-write servers.

12. The medium of claim 11, further comprising instructions that, when executed by the processor, cause the processor to perform operations comprising:
   copying data modifications from the one or more read-write servers to the one or more read-only servers after performance of a write operation.

13. The medium of claim 9, wherein the database comprises a load balancer, the load balancer balancing operational loads on the database.

14. The method of claim 9, wherein a mapping file maps the addresses for instructions to either the first address or the second address.

15. The medium of claim 14 wherein the mapping file is an XML mapping file.

16. The medium of claim 9, wherein the first address and the second address are virtual addresses.

17. A system comprising:
   a database, the database being comprised of:
      a database server containing a read-write version of a set of data, and
      one or more database servers containing a read-only version of the set of data; and
   a file, the file directing a read operation for the database to a first address and directing a write operation for the database to a second address.

18. The system of claim 17, wherein the first address and the second address are virtual addresses.

19. The system of claim 18, wherein the system operates on the Internet and the virtual addresses are virtual IP addresses.

20. The system of claim 17, wherein the database further comprises a load balancer, the load balancer balancing the operational load on the database servers.

21. The system of claim 17, wherein the file is a mapping file.

22. The system of claim 21, wherein the mapping file contains a first tag for a read operation and a second tag for a write operation.

23. The system of claim 22, wherein the mapping file is an XML mapping file.

24. A system comprising:
   a means for separating a database into at least a first partition and a second partition;
   a means for receiving an instruction, the instruction including a database access request;
   a means for assigning an address to the instruction, a first address being assigned to the instruction if the instruction includes writing data to the database, a second address being assigned to the instruction if the instruction includes reading data from the database;
   a means for directing the instruction to the first partition of the database if the first address is assigned to the instruction; and
   a means for directing the instruction to the second partition of the database if the second address is assigned to the instruction.

25. The system of claim 24, wherein the first address and the second address are virtual addresses.

26. The system of claim 24, wherein the first partition of the database comprises one or more database servers that are operable to perform database write operations.

27. The system of claim 26, wherein the second partition of the database comprises one or more database servers that are operable to perform database read operations.

28. The system of claim 27, further comprising a means for balancing the operational load on the database servers.

29. The system of claim 24, further comprising a means of updating data in the second partition of the database upon data being modified in the first partition of the database.

* * * * *